No. 797,081. PATENTED AUG. 15, 1905.
W. B. SMITH.
SPRING CLEVIS.
APPLICATION FILED OCT. 15, 1904.
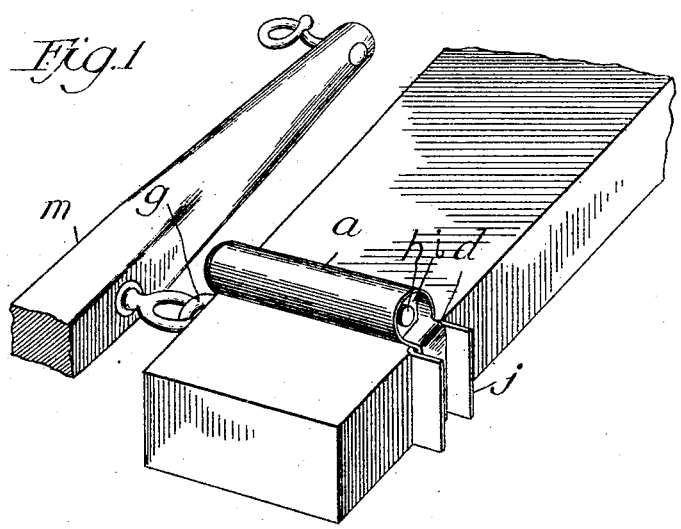
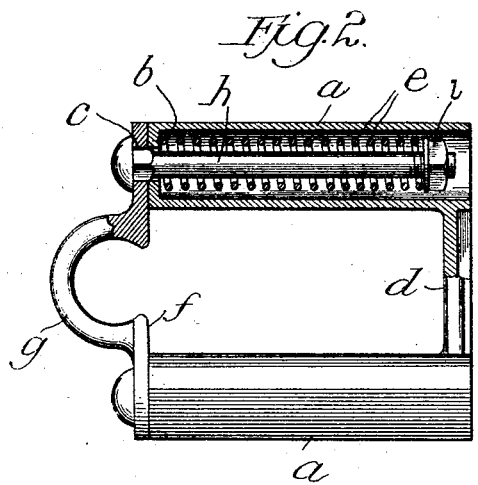
Witnesses:
Edw. P. Barrett
C. E. Jordan
Inventor
William B. Smith,
By David H. Fletcher
his Atty.

UNITED STATES PATENT OFFICE.

WILLIAM B. SMITH, OF SEDALIA, MISSOURI.

SPRING-CLEVIS.

No. 797,081.  Specification of Letters Patent.  Patented Aug. 15, 1905.

Application filed October 15, 1904. Serial No. 228,573.

*To all whom it may concern:*

Be it known that I, WILLIAM B. SMITH, a citizen of the United States, residing at Sedalia, in the county of Pettis and State of Missouri, have invented a new, useful, and Improved Spring-Clevis, of which the following is a description, reference being had to the accompanying drawings, forming a part of this specification, in which corresponding letters of reference in the different figures indicate like parts.

The object of my invention is to provide a spring-clevis for use in connection with doubletrees and otherwise which shall be so constructed that it may be easily attached to or removed therefrom and cheaply manufactured.

To these ends my invention consists in the combination of elements hereinafter more particularly described, and definitely pointed out in the claims.

In the drawings, Figure 1 is a perspective view of a portion of a doubletree, showing my improved clevis attached thereto and the manner in which the whiffletree is connected therewith; and Fig. 2 is a side view partly in central longitudinal section.

Referring to the drawings, $a$ $a$ represent two parallel cylindrical tubes preferably formed from malleable iron, said tubes being open at the rear ends, as shown in Fig. 2, and partially closed at the forward ends by means of a web $b$, having a central opening $c$. Said tubes are preferably connected at one end by means of an integral connection $d$, which is preferably rounded upon its inner face, as shown, and of sufficient length to correspond substantially to the thickness of an ordinary doubletree, while the length of the tubes correspond to or slightly exceed the width of the doubletree. Inserted within each of the tubes is a spiral spring $e$, one of which is shown in Fig. 2, the forward end of the spring being seated against the part $b$. A draft element or cross-plate $f$, having a loop $g$, is connected with the forward end of said tubes by means of bolts $h$, which are passed through bores in said cross-plate, and thence through said springs, being connected with the rear ends of the latter by means of nuts $i$.

Said clevis is preferably attached to the doubletree by means of a U-shaped metal fitting $j$, Fig. 1, into which the cross-bar $d$ is loosely placed.

In lieu of the bolts $h$ and cross-plate $f$ the three parts may be made in one piece, forming a draft member. I prefer, however, the three-part construction.

The whiffletree $m$ is connected, as shown in Fig. 1, with the draft member in the same manner as with any ordinary clevis.

From the foregoing it will be seen that my invention contemplates a two-part extensible clevis one member of which is adapted to be detachably and pivotally connected with the doubletree, while the other member constitutes a draft element, with springs so interposed between the two as to produce a yielding or cushioning effect upon the shoulders of the horse in pulling. The advantage of relieving the animal from the shock of a sudden pull against a dead-weight is so obvious as to indicate the usefulness and desirability of my improvement.

Having thus described my invention, I claim—

1. A spring-clevis consisting of two parallel tubes restricted at the front ends to form interior stops, said tubes being joined together at the rear ends by means of a rigid connection arranged substantially at right angles thereto, said conection being rounded in cross-section to conform to the concave bearing-surface at the rear of a doubletree, when the end of the latter is inserted between said tubes, springs within said tubes, a draft member at the front ends of said tubes extending from one tube to the other, and means for connecting said draft member with the rear ends of said springs, whereby said clevis may hinge upon said concave bearing-surface with its forward end free to move laterally.

2. A spring-clevis consisting of two parallel tubes restricted at their front ends to form interior stops, said tubes being joined together at their rear ends by means of an integral connection arranged substantially at right angles thereto, said connection being rounded in cross-section to conform to a concave bearing-surface at the rear of a doubtetree when the end of the latter is inserted between said tubes, springs within said tubes, a draft member at the front ends of said tubes extending from one to the other, said draft member being provided with a loop between its ends, and means for connecting said draft member with the rear ends of said springs, substantially as specified.

3. A spring-clevis consisting of two parallel tubes open at the rear and restricted at the front ends to form interior stops, said tubes being joined together at the rear ends by means of an integral, rigid connection arranged substantially at right angles thereto, said connection being rounded in cross-section at its front, springs within said tubes, a draft member at the front ends of said tubes extending from one to the other, means for connecting said draft member with the rear ends of said springs, and a U-shaped fitting for attachment to the rear face of a doubletree to serve as a pivotal bearing for said clevis, when the doubletree is inserted between said tubes.

In testimony whereof I have signed this specification, in the presence of two subscribing witnesses, this 11th day of October, 1904.

WILLIAM B. SMITH.

Witnesses:
 D. H. FLETCHER,
 C. E. JORDAN.